Jan. 11, 1955
J. I. YELLOTT
2,699,039
OPEN CYCLE COAL BURNING GAS TURBINE
SYSTEM, WITH REGENERATOR
Original Filed Aug. 17, 1946
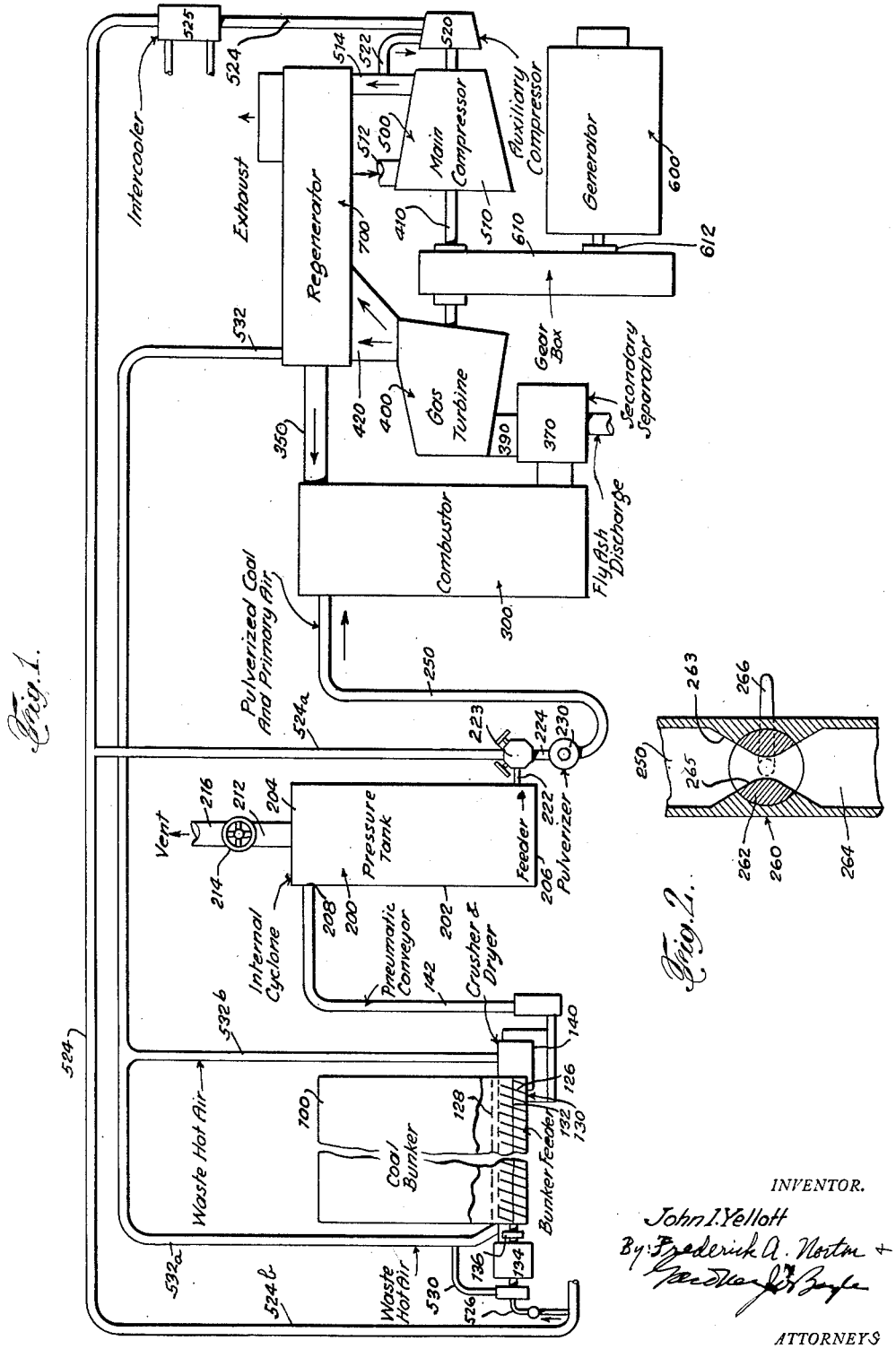
INVENTOR.
John I. Yellott
By: Frederick A. Norton &
Gardner
ATTORNEYS

United States Patent Office

2,699,039
Patented Jan. 11, 1955

---

2,699,039

OPEN CYCLE COAL BURNING GAS TURBINE SYSTEM WITH REGENERATOR

John I. Yellott, New York, N. Y., assignor to Bituminous Coal Research, Inc., Washington, D. C., a corporation of Delaware Original application August 17, 1946, Serial No. 691,307, now Patent No. 2,651,176, dated September 8, 1953. Divided and this application August 15, 1952, Serial No. 304,494

3 Claims. (Cl. 60—39.46)

This invention relates to coal burning gas turbine systems, particularly adapted for use in generating electric locomotives, and more particularly to such a system of improved efficiency in which the waste heat values from the turbine exhaust are recovered by means of a regenerator mounted in the exhaust stack and returned to the system in the motive fluid generator.

This application is a division of my prior application S. N. 691,307, filed August 17, 1946, now Patent 2,651,176, issued September 8, 1953, for Coal Fired Gas Turbine Power Plants.

In my said prior patent the use of bunker coal has been disclosed. The bunker coal is preliminarily crushed and stored in storage hoppers from which it is introduced into pressurized combustive air feed lines incorporating pulverizing means, desirably of the convergent nozzle type, whereby the crushed coal is pulverized and carried into the combustion chamber as a streaming entrainment of pulverulent particles in a combustive air stream.

Bunker coal is usually and desirably wetted down in the bunker to eliminate dust, etc. To prepare the coal for initial grinding or crushing it must be dried, and this is accomplished according to the teachings of the present invention by passing waste hot air from the turbine exhaust through the bunker feeder and the bunker, to preliminarily dry the coal. The hot air stream carrying the crushed and dried coal, is led through a pneumatic conveyor to a crushed coal storage tank wherein the dried solids are separated from the entraining air stream, which stream is then vented to the atmosphere.

By utilizing waste turbine motive fluid which is essentially hot air heated to about 400° F., there is provided drying air of the maximum temperature to be contacted with coal particles of any size. It has been found that above 400° F., particularly under pressure conditions, there is grave danger of spontaneous combustion of the coal.

Among the features of novelty and advantage of the present invention are coal-fired, gas-turbine power plants in which the coal is carried, pneumatically, for delivery to combustors provided with pneumatic coal atomizers, after treatment in crushing or pulverizing equipment, including drying of the coal with waste hot air from the exhaust side of the turbine. The powdered coal is handled and burned in a closed pressure system, incorporating a regenerator in the turbine exhaust for heating the secondary air, the products of combustion being delivered to high-speed gas turbines coupled to electrical generators or mechanical power equipment.

Another feature of novelty and advantage of the invention herein resides in a special coal burning power plant incorporating a regenerator and having a low operating cost; using no water; and having relatively few moving parts to maintain.

The gas-turbine power plant herein is characterized by further advantages in that the weight of the equipment is less than one-half of steam equipment of the same operative capacities, and considerably under that of diesel-electric equipment.

Other features of novelty and advantage of the invention herein reside in the use of coal-fired gas-turbines for stationary power plants, especially in regions lacking a water supply; and as motive power for marine propulsion.

Additional features of novelty and advantage reside in the special fuel-handling and power-generating equipment, of reduced size and weight, with a maximum delivery of power generated, and including maintenance of auxiliary heating services, without requiring special equipment, or the burning of additional fuel, as is now the case.

These and other desirable features of novelty and advantage of the present invention will be described in the accompanying specification, certain preferred forms of equipment being illustrated in the drawing, by way of example only, for, since the underlying principles may be incorporated in other power-generating equipment, it is not intended to be limited to the forms here shown, except as such limitations are clearly imposed by the appended claims.

In the drawing, like numerals refer to similar parts throughout the several views, of which:

Figure 1 is a schematic showing of a gas turbine system incorporating means for preparing and supplying coal for combustion, and a regenerator for recovering waste heat from the turbine exhaust;

Figure 2 is a longitudinal section through a flash pulverized nozzle having symmetrical throat.

For gas turbine service the coal must be under pressure in order to enter the combustion chamber. I have determined that an excess pressure of some 80 lbs. air must be maintained on the upstream side to give satisfactory pulverization. Tests with a convergent nozzle pulverizer show that there are certain peculiar properties of the nozzle which are of distinct advantage in the system herein. Using a nozzle which is so constructed that the angle between divergent sides can be varied continuously over a wide range, I have found that, if the angle is adjusted properly, for a given set of conditions, the pressure of air flowing through the nozzle can be made to fall almost to atmospheric pressure, and then to rise again, to approximate the pressure obtaining in the combustion chamber.

The gas turbine 400, indicated in Figure 1 may be of any suitable construction and preferably designed to operate on the so-called open cycle. The open cycle gas turbine may be briefly described as follows:

Air is drawn from the surrounding atmosphere by the main compressor, and its pressure is raised to an appropriate value, usually about 60 to 75 p. s. i. abs. The temperature of this air, already warmed by compression, can be further raised by transferring to it some of the heat which is being discharged from the exhaust of the turbine. The regenerator can, with reasonable surface, recover from 50% to 75% of the available heat in the air leaving the turbine, and it is quite feasible to introduce the compressed air into the combustor at a temperature well above 600° F. The open-cycle combustor is characterized by the direct burning of the fuel with the exact quantity of air required for complete combustion, which volume is a minor portion of the total air supplied. The remaining air is used for cooling the combustion chamber itself, and for subsequent mixture with the products of combustion, to form a motive gas whose temperature is reduced to a level (ca. 1300° F.) at which the turbine can operate safely.

The major problems involved in making the gas turbine burn coal require that not only must the system be effective for preparing pulverized solid fuel, such as coal, for combustion in such a manner that it can be burned within the limited space available on a locomotive or ship, but the solid residue of the products of combustion must be substantially completely removed in order that the blades of the turbine shall have a reasonable life. The system herein effectively solves this problem and provides a power generating system which is equally adaptable to stationary and marine applications, as well as locomotive purposes, and particularly wherever water is lacking. Even at coal mines, where much power is needed to operate mechanical equipment, good water is usually not available in adequate supply, and the coal-burning gas turbine system herein is especially adapted to serve as an economical prime mover.

The turbine, 400 (Fig. 1) having a horizontal shaft 410, is set on a suitable base, not shown, which also serves to support the air compressors and generating unit at the other end. The air compressors and generating unit will be in alignment with the turbine, the compressors being mounted on the same shaft and driven thereby. The reduction gear 610 is connected through the coupling 612 to generator 600 which may comprise any specific or desired number of units. As contemplated herein, four 1,000 H. P. generators will deliver about 4,000 electrical H. P. with less than 1 lb. of coal per H. P. hour. The regenerator 700 is mounted on the turbine casing and connected therewith by means of an exhaust stack 420.

The feature of the present invention embodying the conveying of the comminuted coal by air is of maximum importance as it accomplishes drying and transferring of the initially crushed coal from the crusher to the pressure hoppers, and from the latter to the combustor.

The air compressor system of the present invention is essentially comprised as follows:

Referring to the drawing and more particularly to Figure 1, thereof, the air supply system 500 comprises an air compressor 510, provided with air intake 512, is driven by shaft 410 of gas turbine 400. This compressor discharges through outlet 514, regenerator 700, and air inlet 350, to the combustor 300. An auxiliary compressor 520 is mounted on the turbine shaft, and is provided with an inlet pipe 522 connecting with the outlet side of the main compressor 510. This auxiliary compressor is provided with an outlet line 524 which connects, through an intercooler 525, and branch line 524a, with the outlet or discharge tube 224 of the pressure storage chamber 200 leading to the combustor 300. A valved branch line 526 connects a second leg 524b to engine 134 which drives a coal feeder 130. Line 530 carries the exhaust from this engine into branch 532a of waste heat line 532 which is connected to the turbine exhaust 420.

The main compressor 510 delivers the main charge of air through regenerator 700, whence it passes through pipe 350 into combustor 300. The heated air passes through the turbine and discharges into the regenerator, thence out to the atmosphere, a certain portion thereof being withdrawn through pipe 532 and delivered to the coal bunker. The pipe 532 may be forked or branched, and one connection is made to the exhaust of the air-motor 134 which drives the bunker feeder, while another connection 532b is made at the discharge end of the bunker feeder to the crusher and dryer 140. The air delivered into the bunker may be directed to the trough thereof, below the feeder plates 128, and will serve to effect an initial drying of the coal deposited in and conveyed by the screw conveyor 126. At the outlet end of the conveyor, a further quantity of hot air is added and works in the crusher and dryer to complete the drying of the coal, as it is ground to the desired 16 mesh size. Waste hot air may also be supplied to the coal bunker at the top thereof, or any point intermediate the structure, or in both hoppers, where bi-lateral, symmetrical hoppers are used. The coal bunkers being hermetically sealed or closed, and the main air supply being introduced into the trough 130, a negative pressure will be established at the outlet of the pressure tank system sufficient to draw the crushed and dried coal through the pneumatic conveyor 142 into pressure tank system 200.

In the pressure tank system 200, the waste hot air is separated from the entrained or air borne 16-mesh fuel, and is discharged to the atmosphere through vents 216. The auxiliary compressor 520 is adapted to deliver air at higher compression than main compressor 510. This high compression air is delivered through pipe 524 and discharge manifold 223 of the pressure feeders which are connected through pipe 224, flash pulverizer 230, and feed pipe 250, to combustor 300. Manifold 223 is supplied with crushed coal through feed lines 222.

While a conventional convergent pulverizing nozzle has been indicated generally as 230, the invention also comprehends the use of a reversible nozzle system indicated generally by numeral 260, Figure 2. In this form a rotary plug 262, controlled by handle 266, is inserted in line 250. The up-stream and down-stream portions of duct 250 are provided with symmetrical convergent and divergent walls 263, 264, normally in register with the walls of the throat 265, of the rotary plug.

Considering the general operation of the system, and with particular reference to the air system, and the combustion system, it is to be noted that air compressed to 75 lbs. per square inch, absolute, and heated to 1300° F., drives the turbine. It is noted further that the air required for the transport and flash pulverization of the initially crushed coal is provided by an auxiliary compressor 520. The waste heat from the regenerator is utilized for generating train heating steam and for other services. Waste hot air from the regenerator will be delivered to the coal bunker, serving to dry the coal. A suction fan may be provided for drawing the coal through the crusher and drying the same, as well as conveying the crushed and dried coal into the pressure storage chambers where the air is separated from the entrained particles and vented to the atmosphere. Air at 140 lbs. per square inch pressure, serves to transport the ground coal from the storage chambers to the flash pulverizer, where the pressure is dropped to 65 lbs. per square inch, with resulting flash pulverization of the coal which is immediately burned in a special combustion chamber. The products of combustion are diluted with excess air derived from the main compressor and regenerator to reduce the temperature to 1300° F., and form a motive gas to drive the turbine. Because of the pulverization feature of the flash pulverizer and the use of the vortex type of combustor, a heat release in excess of 1,500,000 B. t. u. per hour per cubic foot is attained.

In the operation of a power system according to the present invention, coal is fed from bunker 100, through a suitable mill or grinder 140, to pressure hoppers 200, from which it is delivered, under pressure, to the combustor 300. The gaseous products of combustion are delivered from the combustor to the gas-turbine 400, the fly ash being separated en route. The gaseous products of combustion are discharged from the turbine and are vented to the atmosphere through regenerator 700. The turbine and the compressors, designated generally by numerals 400 and 500, are mounted on a common shaft 410 which is coupled to generators 600 in any suitable manner, as through a gear box 610. The equipment is essentially controlled by suitable throttle means controlling the feed of the pulverized fuel, under pressure, to the combustor. Because of the operative characteristics of the gas-turbine, the power developed can be readily controlled by controlling the fuel input.

It will now be appreciated that there has been provided novel pressurized combustion systems for utilizing pulverized solid fuels in which the products of combustion of the system are fed, as motive fluid, into a gas turbine, mounted on a common shaft with a main compressor, and coupled to a generator or mechanical power translating mechanism. The necessary compressed air for maintaining the pressure combustion system with a pressure drop of the order of 80 p. s. i. between the feed to the combustor and the combustor chamber is supplied by a high pressure compressor. The waste heat from the regenerator is used in a suction fluid stream to transport and drive the raw fuel from a bunker, through a breaker or comminutor, to a comminuted fuel-storage chamber, where it is de-aerated, and from whence it is transported, in a separate stream of high-pressure compressed air, delivered by a high pressure compressor, to the combustor feeding the gas turbine. The system herein has been shown to be particularly adapted for locomotive use, and the special assemblage of cooperating parts has been shown to have novel and desirable characteristics imparting unpredictable efficiencies and operating factors in such use. Additionally, the power units herein have been shown to be adapted for use generally in marine installations and in power plants, particularly those located in localities where pure water is not available. Because of the fact that the system herein does not involve the use of water or steam as motive fluids, appreciable overall savings in equipment and installation and maintenance costs for the same are made possible.

Various modifications will occur to those skilled in the art in the composition, configuration and disposition of the component elements going to make up the invention as a whole as well as in the selection and combination of particular features for specific purposes, and no limitation is intended by the phraseology in the foregoing description or illustrations in the accompanying drawing except as indicated in the appended claims.

What is claimed is:

1. In a gas turbine system having a pressure combustor feed, including a source of solid fuel, the improvements comprising a regenerator mounted in the outlet of the turbine, a main low-pressure compressor connected through the regenerator to the combustor of the turbine, a second, high-pressure auxiliary compressor delivering cooled high-pressure air from the main compressor to the inlet of the combustor, said high-pressure cooled air stream serving as a carrying fluid for the solid fuel, and means for introducing comminuted solid fuel into the high-pressure air stream.

2. In a gas turbine system having a pressure combustor feed, including a source of solid fuel, the improvements comprising a regenerator mounted in the exhaust vent of the turbine, a main low-pressure compressor connected through the regenerator to the combustor of the turbine, an auxiliary compressor delivering cooled high-pressure air from the main compressor to the inlet of the combustor, said high-pressure air stream serving as a carrying fluid of constant volume and constant pressure for comminuted solid fuel, and means for introducing comminuted solid fuel into the high-pressure air stream.

3. In a gas turbine system having a pressure combustor feed, including a source of solid fuel, the improvements comprising a regenerator mounted in the exhaust vent of the turbine, a main low-pressure compressor connected through the regenerator to the combustor of the turbine, an auxiliary compressor delivering high-pressure air from the main compressor to the inlet of the combustor, high-pressure air stream serving as a carrying fluid of constant volume and constant pressure for comminuted solid fuel, and variable-feed means for introducing comminuted solid fuel into the high-pressure air stream.

References Cited in the file of this patent

UNITED STATES PATENTS

| | | |
|---|---|---|
| 2,159,849 | Graemiger | May 23, 1939 |
| 2,305,785 | Jendrassik | Dec. 22, 1942 |
| 2,407,165 | Kreitner et al. | Sept. 3, 1946 |